US011275561B2

(12) United States Patent
Mueller et al.

(10) Patent No.: US 11,275,561 B2
(45) Date of Patent: Mar. 15, 2022

(54) MIXED PRECISION FLOATING-POINT MULTIPLY-ADD OPERATION

(71) Applicant: INTERNATIONAL BUSINESS MACHINES CORPORATION, Armonk, NY (US)

(72) Inventors: Silvia Melitta Mueller, Altdorf (DE); Andreas Wagner, Weil im Schönbuch (DE); Brian W. Thompto, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 182 days.

(21) Appl. No.: 16/712,114

(22) Filed: Dec. 12, 2019

(65) Prior Publication Data

US 2021/0182024 A1  Jun. 17, 2021

(51) Int. Cl.
*G06F 7/544* (2006.01)
*G06F 7/487* (2006.01)
(Continued)

(52) U.S. Cl.
CPC .......... *G06F 7/5443* (2013.01); *G06F 7/4876* (2013.01); *G06F 7/49957* (2013.01); *G06N 3/04* (2013.01); *G06N 3/08* (2013.01)

(58) Field of Classification Search
CPC .. G06F 7/5443; G06F 7/4876; G06F 7/49957; G06N 3/04; G06N 3/08
See application file for complete search history.

(56) References Cited

U.S. PATENT DOCUMENTS

2007/0074008 A1   3/2007  Donofrio
2017/0103304 A1*  4/2017  Henry ...................... G06N 3/04
(Continued)

FOREIGN PATENT DOCUMENTS

CN        109634558 A       4/2019

OTHER PUBLICATIONS

"BFLOAT16—Hardware Numerics Definitial"; White Paper; Document No. 338302-001US, Revision 1.0; Intel; Nov. 2018; 7 Pages.
(Continued)

*Primary Examiner* — Michael D. Yaary
(74) *Attorney, Agent, or Firm* — Cantor Colburn LLP; Brian Welle

(57) ABSTRACT

An example computer-implemented method includes receiving a first value, a second value, a third value, and a fourth value, wherein the first value, the second value, the third value, and the fourth value are 16-bit or smaller precision floating-point numbers. The method further includes multiplying the first value and the second value to generate a first product, wherein the first product is a 32-bit floating-point number. The method further includes multiplying the third value and the fourth value to generate a second product, wherein the second product is a 32-bit floating-point number. The method further includes summing the first product and the second product to generate a summed value, wherein the summed value is a 32-bit floating-point number. The method further includes adding the summed value to an addend value to generate a result value, wherein the addend value and the result value are 32-bit floating-point numbers.

25 Claims, 8 Drawing Sheets

(51) Int. Cl.
G06N 3/04 (2006.01)
G06N 3/08 (2006.01)
G06F 7/499 (2006.01)

(56) References Cited

U.S. PATENT DOCUMENTS

2019/0155574 A1* 5/2019 Langhammer ........ G06F 7/5443
2019/0340489 A1 11/2019 Mills
2019/0355150 A1 11/2019 Tremblay et al.
2019/0373241 A1 12/2019 Boyce et al.

OTHER PUBLICATIONS

"Intel Architecture Instructions Set Extensions and Future Features Programming Reference"; Reference No. 319433-036; Intel; Apr. 2019; 149 Pages.
Zhang et al.; "Efficient Flixed/Floating-Point Merged Mixed-Precision Multiply—Accumulate Unit for Deep Learning Processors"; IEEE; 2018; 5 Pages.
International Search Report Issued in International Application No. PCT/IB2020/060912; International Filing Date Nov. 19, 2020; dated Feb. 25, 2021; 3 Pages.
Written Opinion Issued in International Application No. PCT/IB2020/060912; International Filing Date: Nov. 19, 2020; dated Feb. 25, 2021; 4 Pages.

* cited by examiner

MIXED PRECISION FLOATING-POINT MULTIPLY-ADD OPERATION

BACKGROUND

The present invention generally relates to data processing systems, and more specifically, to performing a mixed precision floating-point multiply-add operation.

Numerical support within a processor can include mathematical operations to increase computational efficiency and throughput. Some mathematical operation instructions implemented within a processor can include combined operations, such as multiply-and-accumulate (MAC) operations. In some examples, such operations are performed using float-point arithmetic. Such operations are useful, for example, for training deep neural networks (DNNs), which is a fast-growing workload and is applicable to the cognitive enterprise. Training DNNs can be very compute-resource intensive, whereas DNN inference is very latency-sensitive.

SUMMARY

Embodiments of the present invention are directed to performing a mixed precision floating-point multiply-add operation.

A non-limiting example computer-implemented method for performing a mixed precision floating-point multiply-add operation includes receiving, by a processing device, a first value, a second value, a third value, and a fourth value, wherein the first value, the second value, the third value, and the fourth value are 16-bit floating-point numbers. The method further includes multiplying, by the processing device, the first value and the second value to generate a first product, wherein the first product is a 32-bit floating-point number. The method further includes multiplying, by the processing device, the third value and the fourth value to generate a second product, wherein the second product is a 32-bit floating-point number. The method further includes summing, by the processing device, the first product and the second product to generate a summed value, wherein the summed value is a 32-bit floating-point number. The method further includes adding, by the processing device, the summed value to an addend value to generate a result value, wherein the addend value and the result value are 32-bit floating-point numbers. The method further includes training, by the processing device, a deep neural network based at least in part on the result value.

A non-limiting example computer-implemented method for training a deep neural network includes performing, by a processing device, a plurality of multiply-and-accumulate (MAC) operations. Each of the plurality of MAC operations is performed by: multiplying, by the processing device, a first value and a second value to generate a first product, wherein the first value and the second value are 16-bit floating-point numbers, and wherein the first product is a 32-bit floating-point number; multiplying, by the processing device, a third value and a fourth value to generate a second product, wherein the third value and the fourth value are 16-bit floating-point numbers, and wherein the second product is a 32-bit floating-point number; summing, by the processing device, the first product and the second product to generate a summed value, wherein the summed value is a 32-bit floating-point number; and adding, by the processing device, the summed value to an addend value to generate a result value, wherein the addend value and the result value are 32-bit floating-point numbers. The method further includes training, by the processing device, the deep neural network based at least in part on the result value of the each of the MAC operations.

These embodiments improve throughput and latency of multiply-add operations. Other embodiments of the present invention implement features of the above-described methods in computer systems and computer program products.

One or more embodiments can include the first product and second product being computed without rounding and the summed value and the result value being rounded according to IEEE-754 standard. In such cases, the first value, the second value, the third value, and the fourth value are in a format selected from the group consisting of IEEE-754 half precision format, a bfloat-16 format, and a DLfloat16 format. This approach maintains IEEE-754 standard compliance in the result value.

One or more embodiments can include, responsive to at least one of the first product, the second product, or the summed value exceeding a normal range, performing precision rounding on the respective first product, second product, or summed value to perform the multiplying and summing by rounding a mantissa component of the respective first product, second product, or summed value to single precision while maintain an exponent component without rounding the exponent component. This approach maintains an exponent component without rounding until until the products are summed and thereby increasing precision. In some examples, the first value, the second value, the third value, and the fourth value are in a bfloat-16 format.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
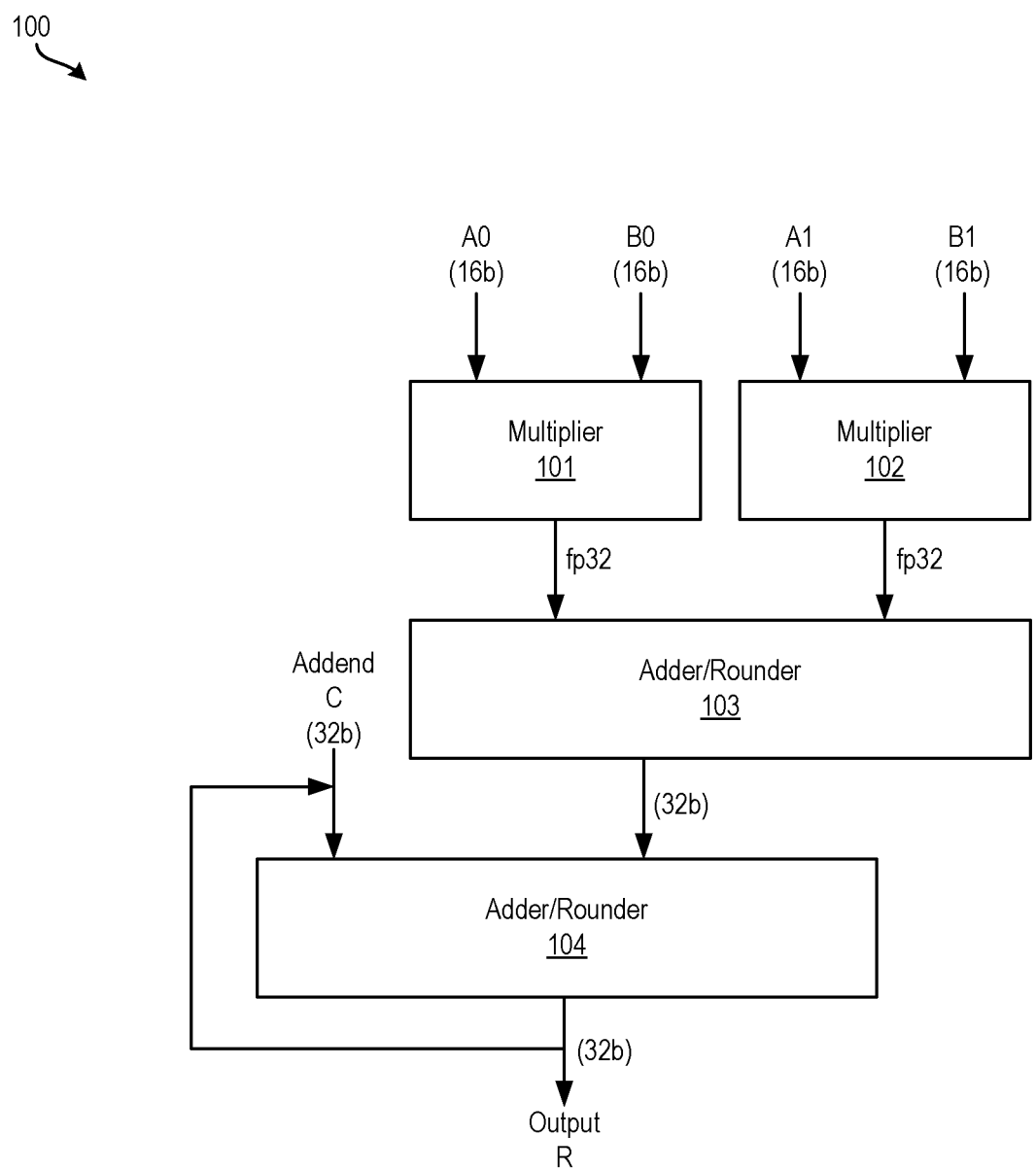
FIG. 1 depicts a block diagram of logic for performing a mixed precision floating-point multiply-add operation according to one or more embodiments described herein.

The diagrams depicted herein are illustrative. There can be many variations to the diagram or the operations described therein without departing from the scope of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide for performing a mixed precision floating-point multiply-add operation.

A deep neural network (DNN) is a type of artificial neural network (ANN), which has the capacity to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

As described herein, training a DNN is very compute resource-intensive whereas DNN inference is very latency-sensitive. It is therefore important to attempt to make DNN training and inference as high performing as possible while focusing on power-performance and compute density. Low precision and ultra-low precision floating-point arithmetic play a role to achieve this goal.

The basic function in DNN training and inference are big dot products. Conventionally, the inputs of these dot products (activations and weights) are in 16-bit (16 b) floating-point (fp). When a multiply-and-accumulate (MAC) operation is performed, the multiplication is performed on the 16 b fp and the accumulation of the product of the multiplication is performed in 32-bit (32 b) fp.

The basic underlying operation is a mixed-precision MAC (also referred to as "multiply-accumulate" or "multiply-add") operation with fp16 (notation meaning "16-bit floating-point") product terms and fp32 (notation meaning 32-bit floating-point") addend and result. The goal is to achieve for this base operation low latency, high throughput and while still maintaining suitable power-performance and area-performance. Several existing formats for fp16 exist, including: IEEE-754 half-precision (sign (1b), exponent (5b), and fraction (10b)); bfloat16(sign (1b), exponent (8b), and fraction (7b)); and IBM's DLfloat16 (sign (1b), exponent (6b), and fraction (9b)). The techniques presented herein apply to each of these three formats and is especially beneficial for the bfloat16 format (while still being beneficial for the IEEE-754 half-precision and DLfloat16 formats).

The above-described aspects of the invention address the shortcomings of the prior art by providing a mixed precision floating-point multiply-add operation that is as high performing and power-efficient as possible. That is, the techniques described herein provide a low latency, high throughput approach to performing a mixed precision floating-point multiply-add operation. The techniques described herein can be applied not only to fp16 formats but to other formats as well, such as fp8, fp4, etc.

Two different conventional techniques for performing a MAC operation with fp16 product terms (operands) are as follows. One conventional approach is for a special purpose engine. In such cases, the operation R=A*B+C, where A,B are fp16 and R,C are fp32 (i.e., fp32=fp16*fp16+fp32). In this example, conceptually, the fp16 operands are extended to fp32 and then a conventional 32-bit floating-point fused multiply-add (FMA) operation can be performed. The only difference to a conventional fp32 FMA operation is that this mixed precision approach allows for a smaller multiplier. The drawback of this approach is that the product operands are half as wide as the addend and result. For a conventional single instruction, multiple data (SIMD) engine, where all operands and results are accessed from a register file, the throughput is limited to that of a conventional fp32 FMA operation. That is, there is no throughput benefit of using this approach for fp16 operands. The benefit comes only when this approach is used in a special purpose engine, which can hold the addend/result in a different data structure (e.g., an accumulator register). Only under these special conditions, the fp16 operands can yield two-times higher throughput over a conventional fp32 FMA, but again, there is no throughput benefit of using this approach for fp16 operands.

Another conventional technique for performing a MAC operation with fp16 product terms is for an SIMD engine in a conventional processor. In such cases, it is suggested to fuse two of the mixed precision multiply-add operations as above into a single operation. For example, R=A1*B1+ (A0*B0+C). Again, A0,A1,B0,B1 are fp16 and R,C are fp32 (i.e., fp32=fp16*fp16+(fp16*fp16+fp32)). For easier arithmetic, this approach flushes subnormal operands to zero and forces subnormal results to zero while only supporting a single rounding mode (round nearest even). This simplified approach to the handling of subnormal operands is acceptable for DNN processing since these computations are assumed to rarely fall into this range. This approach can provide a two-fold increase in throughput over a conventional fp32 FMA for fp16 even in a regular SIMD engine. However, fusing the two FMA operations as suggested deepens the pipeline and increases back-to-back latency of such an operation. For example, for processors with out-of-order execution (i.e., out-of-order processors), this approach deepens the data structures in the sequencer and the number of register renames, making it harder to run such a unit at 100% utilization. With best of breed optimization, this approach results in a latency that is at least one-and-a-half times the latency of a conventional fp32 FMA operation. This problem compounds when applying this approach to fp8 operands because fusing four data-dependent mixed precision FMA operations into one significantly increases the depth of the addend-to-result paths, which is essential for the multiply-add used in the dot products of DNN training.

One or more embodiments of the present invention provide technological improvements over current methods of performing floating-point multiply-add operations that fail to improve both throughput and latency. Disadvantages of contemporary approaches may include improving only one of throughput or latency, not both. One or more embodiments of the present invention provide technical solutions to one or more of these disadvantages of existing solutions by proposing a mixed precision floating-point multiply-accumulate instruction. For example, the present techniques propose a combination of 16-bit and 32-bit floating-point to compute R=(A0*B0+A1*B1)+C, where A0,A1,B0,B1 are 16-bit floating numbers and R,C are 32-bit (single precision) floating-point numbers. The products (i.e., A0*B0 and A1*B1) are computed in single precision and added together to produce a single-precision sum, which is rounded. This rounded sum is then added to the addend C, producing the result R, which is rounded to single precision. This approach can be in the IEEE-754 half-precision format, the bfloat16 format, or the DLfloat16 format and particularly supports the rounding modes of the IEEE-754 format and subnormal handling.

Turning now to FIG. 1, a block diagram of logic 100 for performing a mixed precision floating-point multiply-add operation is depicted according to one or more embodiments described herein. According to examples, the logic 100 and the various components, modules, engines, etc. described regarding FIG. 1 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects presently described, the logic and various components, modules, engines, etc. of FIG. 1 can be a combination of hardware and programming. The programming can be processor executable instructions stored on a tangible memory, and the hardware can include a processing device for executing those instructions. Thus a system memory (e.g., memory 824) can store program instructions that when executed by the processing device (e.g., the processors 821) implement the functionality described herein. Other logic, components, modules, engines, etc. can also be utilized to include other features and functionality described in other examples herein.

While training DNNs, for example, many products may need to be added together. Thus, it is beneficial to reduce the latency of the addend back to input of the MAC operation. The present techniques reduce such latency using the approach depicted in FIG. 1 as one such example. Using the techniques described herein, the back-to-back latency of the addend is either the depth of a floating-point addition or at most that of an FMA operation and is less deep than conventional approaches. The actual depth can depend on the implementation of the last addition (i.e., whether that is performed in an FP32 adder on an FP32 FMA engine).

As shown in FIG. 1, the logic 100 includes multipliers 101, 102, which multiply together two floating-point numbers to generate products that are 32-bit single precision floating-point numbers. For example, the multiplier 101 receives two floating-point numbers A0 and B0, which are each 16-bit numbers. Similarly, the multiplier 102 receives two other floating-point numbers A1 and B1, which are each 16-bit numbers. The products (i.e., A0*B0 and A1*B1) of the two multipliers 101, 102 represent single-precision floating-point numbers, which are received in an adder/rounder 103. In some embodiments, the products of the two multipliers 101, 102 are in an intermediate data format that utilizes additional bits. In such cases, the products can be fp32 numbers that are transmitted to the adder/rounder 103 in the intermediate data format. The adder/rounder 103 adds the products (i.e., A0*B0 and A1*B1) together, and the sum (also a 32-bit floating-point number) is then fed to adder/rounder 104. The adder/rounder 104 adds together the summed value from the adder/rounder 103 to an addend C (a 32-bit floating-point number) to generate an Output R, which is also a 32-bit floating-point number. As shown, the output of the adder/rounder 104 is fed back into the adder/rounder 104 iteratively.

In some examples, such as using bfloat16 format, the adder/rounders 103, 104 need to round the products/sums respectively because the exponent portion can become too large or small and result in an out-of-range error condition. For example, when the products of the multipliers 101, 102 stay within a normal range of single precision, then the products are computed in single precision and added together (by the adder/rounder 103) to produce a single-precision sum. The rounded sum is then added to the addend C producing the result Output R. This is equivalent to extending the fp16 numbers to fp32 and performing the sequent of fp32 operations as follows: R1=A1*B1, R2=R1+A2*B2, R=R2+C.

According to one or more embodiments described herein, the various IEEE rounding modes are supported and full subnormal handling for operands and the final result (i.e., the result Output R). Operations of multiple types can be supported, including scalar operation which works on one data set, SIMD operations which work on multiple sets of data/vectors, and/or array operations which work on multiple data sets producing an outer product.

According to one or more embodiments described herein, when at least one of the products of the multipliers 101,102, or their sum (i.e., the sum of the adder/rounder 103) exceeds de normal range of single precision (such as when using bfloat16), precision rounding is used for computing the products and their sum. For example, for the products and the sum of the products, the mantissa component of the number is rounded to single precision and the exponent component is kept exact (this utilizes extra bits in the intermediate data format used to transfer the partial results from the multipliers 101,102 to the adder/rounder 103 and from the adder/rounder 103 to the adder/rounder 104). The final result (i.e., Output R) is still fully IEEE compliant rounded to single precision (i.e., the exponent component is not rounded down by the adder/rounder 103 and is instead rounded at the end by the adder/rounder 104 after the sum of the products (from the adder/rounder 103) is added to the addend C by the adder/rounder 104).

Figure 2:
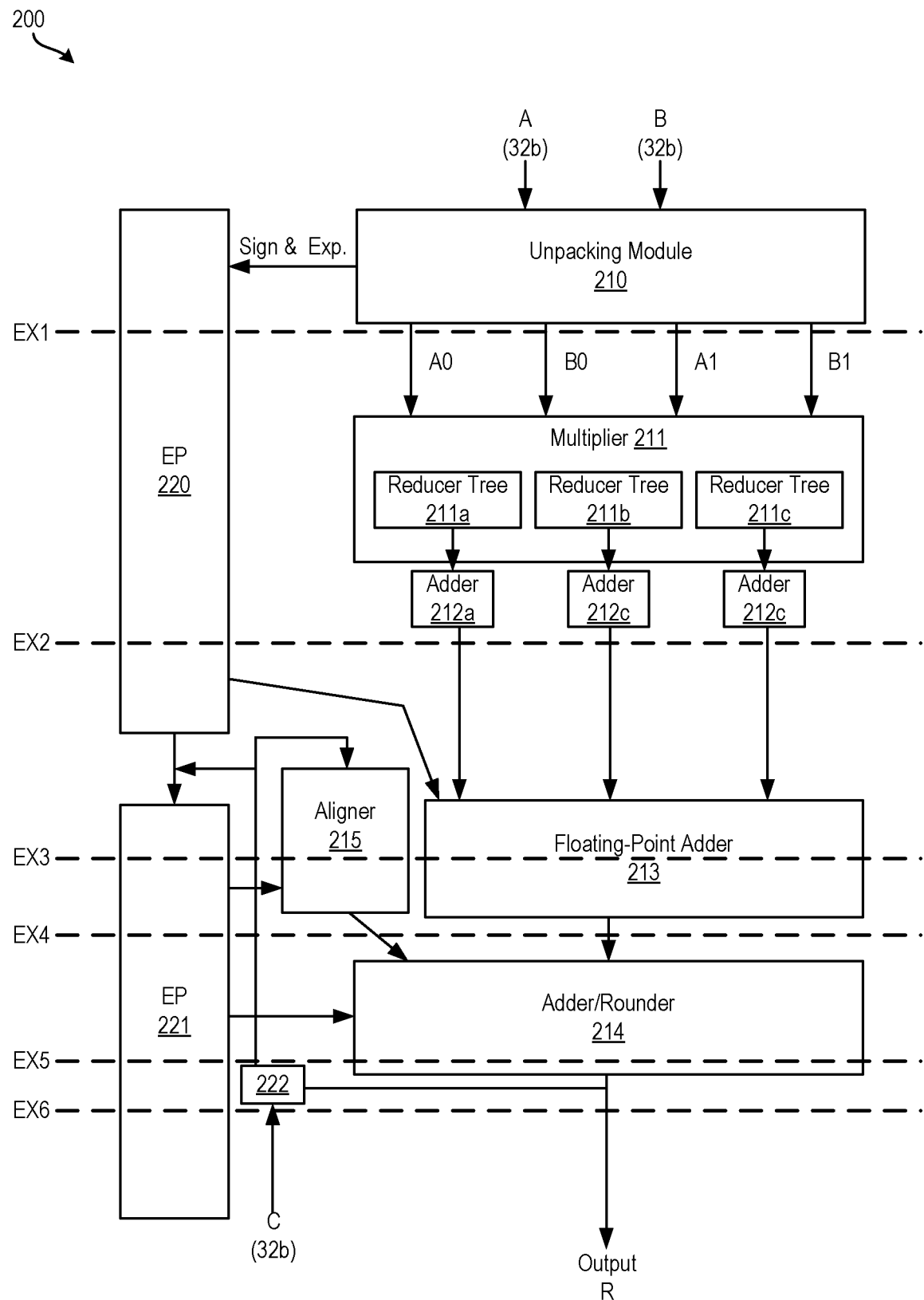
FIG. 2 depicts a block diagram of logic for performing a mixed precision floating-point multiply-add operation according to one or more embodiments described herein.

FIG. 2 depicts a block diagram of logic 200 for performing a mixed precision floating-point multiply-add operation according to one or more embodiments described herein. The logic 200 depicted in FIG. 2 shows how to map an fp16/fp32 fused multiply-multiply-add (FMMA) operation as described herein (e.g., see FIG. 1) to a conventional fp32 FMA execution pipeline. Thus, the logic 200 can perform a conventional fp32 FMA operation and/or the fp16 FMMA operation described herein. The logic 200 is optimized to reduce back-to-back latency while improving power-performance. According to one or more embodiments described herein, the logic 200, operating at 4 GHz, has a 6-cycle pipeline (shown as EX1, EX2, EX3, EX4, EX5, EX6 in FIG. 2) with 4-cycle back-to-back latency. EP 220, 221 represent the exponent part of the floating-point engine.

Two 32-bit values A and B are received at the unpacking module 210. The operands A, B are 32-bit wide and, depending on the operation, they are unpacked into their constituent components: a sign component, an exponent component, and a mantissa component either as a pair of fp16 bit numbers. For example, A0,A1 represent the mantissas of either: as 2×fp16 numbers for FMMA or as 1×fp32 number for FMA. As shown in FIG. 2, the sign and exponent components are sent to the EP 220. The unpacked values A0,A1,B0,B1 are fed into a multiplier 211, which can be a Booth multiplier, for example. In the case of a Booth multiplier, the booth multiplier first generates several partial products, which then get reduced using multiplier reduction trees (referred to herein as "reducer trees"). In particular, the multiplier 211 includes reducer trees 211$a$,211$b$,211$c$. The reducer trees 211$a$,211$b$ calculate partial products of constituent components of the two terms received by the unpacker 210. Some of the partial products are for the first fp16 product (e.g., the product of the multiplier 101 of FIG. 1), some of the partial products are for the second fp16 product (e.g., the product of the multiplier 102 of FIG. 1), and some of the partial products are extra terms used for fp32. Implementations utilizing FP32 uses these extra terms and the ones for the two fp16 products. In other words, the reducer tree 211$a$ reduces the partial products for the fp16 product A0*B0 like the multiplier 101 of FIG. 1. Similarly, the reducer tree 211$b$ reduces the partial products for the fp16 product A1*B1 like the multiplier 102 of FIG. 1. The reducer tree 211$c$ compresses the remaining terms needed for an fp32 product and the results the reducer trees 211$a$, 211$b$ computing the product of two fp32 operands. The outputs of the reducer trees 211$a$,211$b$,211$c$ are fed into respective adders 212$a$,212$b$,212$c$. The adders 212$a$,212$b$ are 22-bit adders, while the adder 212$c$ is a 24-bit adder. The outputs of the adders 212$a$,212$b$,212$c$ are fed into a floating-point adder 213 (e.g., the adder/rounder 103 of FIG. 1), which can be a near-far path adder that performs fp32 addition using a near-far path technique. The floating-point adder 212 also receives exponent and sign terms from the EP 220. The product from the floating-point adder 213 is fed into adder/rounder 214 as one operand term. The multiplexor 222 selects between the 32b operand C and the Output R and feeds that value as addend operand to the aligner 215 and the exponent block EP 221. The aligner 215 in combination with signals from the exponent block EP 221 aligns the addend relative to the product provided by adder/rounder 213, and feeds this aligned addend to the adder/rounder 214 as a second operand. The adder/rounder 214 then computes the sum or absolute difference of the two operands (i.e.: aligned addend and product) producing an intermediate result, and it then normalizes and rounds this intermediate result, and the result Output R is generated.

Figure 3:
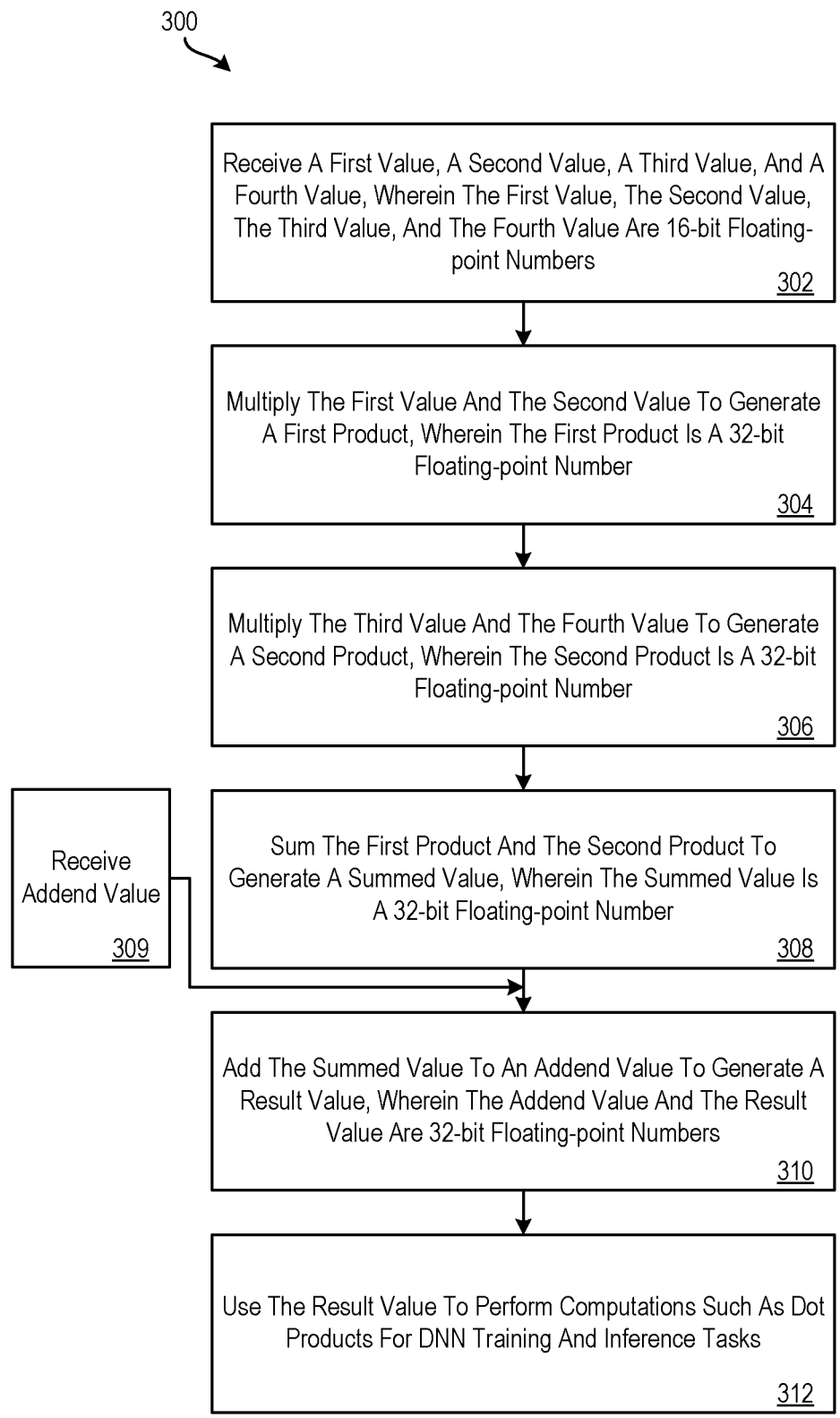
FIG. 3 depicts a flow diagram of a method for performing a mixed precision floating-point multiply-add operation according to one or more embodiments described herein.

FIG. 3 depicts a flow diagram of a method 300 for performing a mixed precision floating-point multiply-add operation according to one or more embodiments described herein. The method 300 can be performed by any suitable processing system, (e.g., the processing system 800 of FIG. 8, the cloud computing node 10 of FIG. 6, the processing system 5 of FIG. 5, etc.), any suitable processing device (e.g., the processors 821 of FIG. 8, the processor 501 of FIG. 5, etc.), and the like, and/or combinations thereof.

At block 302, a first value, a second value, a third value, and a fourth value are received. For example, with reference to FIG. 1, the first value (e.g., A0) and the second value (e.g., B0) are received at the multiplier 101; similarly, the third value (e.g., A1) and the fourth value (e.g., B1) are received at the multiplier 102. The first, second, third, and fourth values are 16-bit floating-point numbers according to one or more embodiments described herein. However, these values can be 8-bit, 4-bit, etc. floating-point numbers in other embodiments. In examples, the first value, the second value, the third value, and the fourth value are in one of the following formats: IEEE-754 half-precision format, bfloat-16 format, and DLfloat16 format.

At block 304, the first value and the second value are multiplied (e.g., by the multiplier 101) to generate a first product. Similarly, at block 306, the third value and the fourth value are multiplied (e.g., by the multiplier 102) to generate a second product. According to one or more embodiments described herein, the first product and the second product are each a 32-bit floating-point number (single precision). In another embodiment where the product operands are fp8, the product here can be fp16 instead of single-precision (i.e., twice the precision of the operands).

At block 308, the first product and the second product are summed (e.g., by the adder/rounder 103) to generate a summed value. According to one or more embodiments described herein, the summed value is a 32-bit floating-point number (single precision). At block 309, an added value is received. At block 310, the summed value is added (e.g., by the adder/rounder 104) to the addend value (e.g., addend C) received at block 309 to generate a result value (e.g., Output R). According to one or more embodiments described herein, the addend value and the result value are 32-bit floating-point numbers (single precision).

At block 312, the result value is used to perform computations such as dot products for deep neural network training and inference tasks. For example, as described herein, training a deep neural network utilizes MAC operations, which are performed using the techniques described in blocks 302, 304, 306, 308.

Additional processes also may be included. According to one or more embodiments described herein, the first product and the second product each include a mantissa component and an exponent component. In such examples, the method 300 can further include rounding the exponent component of at least one of the first product and the second product. Further, the method 300 can include adding a rounded portion of the rounding of the exponent component of at least one of the first product and the second product to the addend value to produce the rust value rounded to single precision. For example, for bfloat16, a special rounding is used when the exponent exceeds the normal range as described herein. This can be referred to as exponent rounding. However, in embodiments that use IEEE half precision or DLfloat16, the product of two fp16 numbers always stays within the range of IEEE single precision number, the products are exact, and the steps 304 and 306 can be performed without any rounding. The sum of such two products also stays within the fp32 data range, and only the mantissa needs to be rounded; the exponent never exceeds its normal range. When using bfloat16, the products of the fp16 numbers and their sum can exceed the range of fp32. Thus, in one example, denormalization and rounding of the mantissa can be performed when the exponent exceeds the normal range. According to one or more embodiments described herein, the method 300 can further include, responsive to at least one of the first product, the second product, or the summed value exceeding a normal range, performing precision rounding on the respective first product, second product, or summed value to perform the multiplying and summing by rounding the mantissa component of the respective first product, second product, or summed value to single-precision while maintain the exponent component without rounding the exponent component. It should be understood that the process depicted in FIG. 3 represents an illustration, and that other processes may be added or existing processes may be removed, modified, or rearranged without departing from the scope of the present disclosure.

Figure 4:
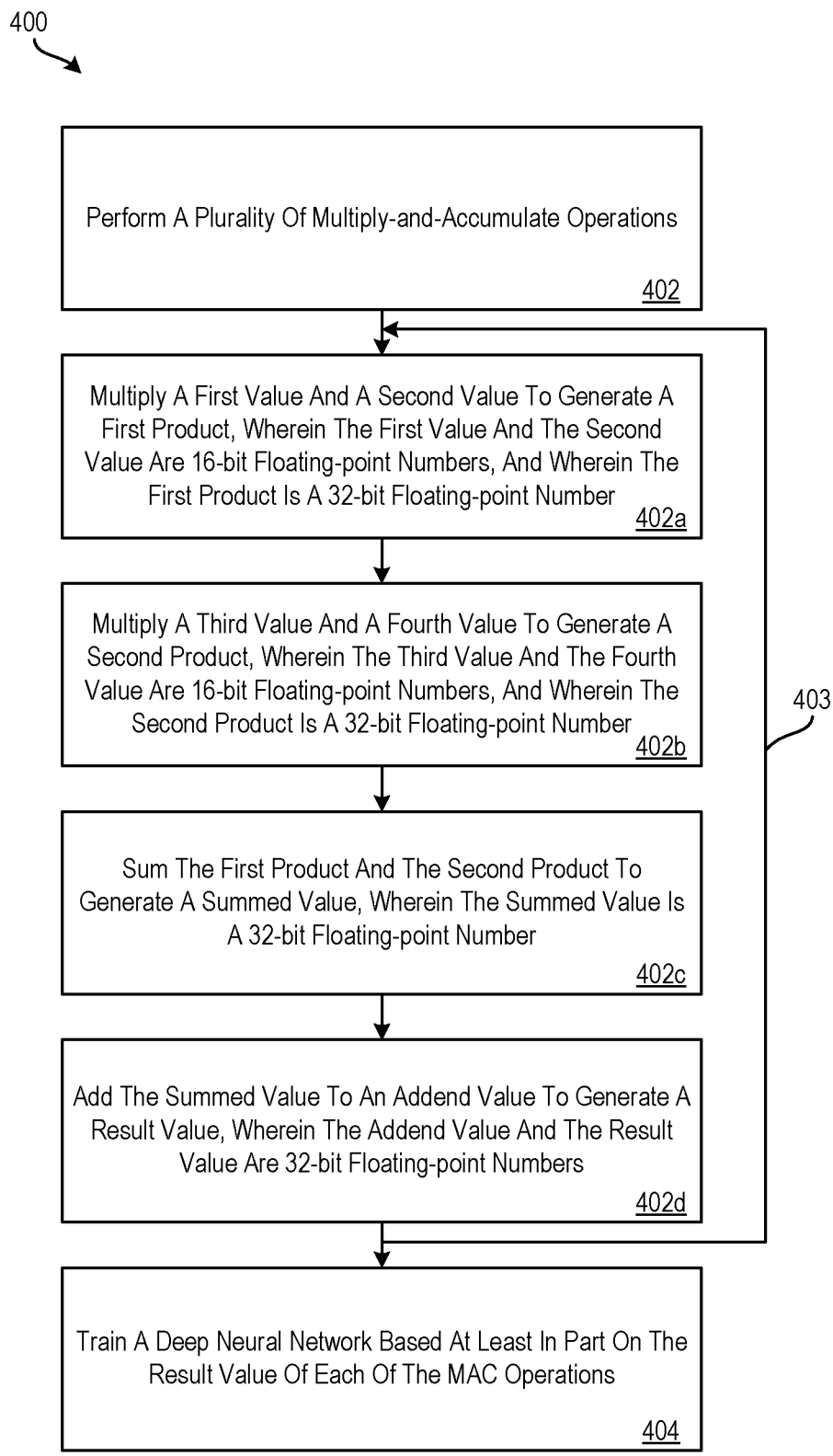
FIG. 4 depicts a flow diagram of a method for performing a dot product for deep neural network training and inference according to one or more embodiments described herein.

FIG. 4 depicts a flow diagram of a method 400 for performing a dot product for deep neural network training and inference according to one or more embodiments described herein. The method 400 can be performed by any suitable processing system, (e.g., the processing system 800 of FIG. 8, the cloud computing node 10 of FIG. 6, the processing system 5 of FIG. 5, etc.), any suitable processing device (e.g., the processors 821 of FIG. 8, the processor 101 of FIG. 5, etc.), and the like, and/or combinations thereof.

At block 402, the method 400 includes performing a plurality of MAC operations such as by a compute array (e.g., the compute array 513 of FIG. 5 discussed herein) (block 402). At block 404, the method 400 then includes training a deep neural network based at least in part on results of the plurality of MAC operations. Performing each of the plurality of MAC operation is performed according to blocks 402a, 402b, 402c, 402d as follows.

At block 402a, a first value (e.g., A0) and a second value (e.g., B0) are multiplied (e.g., by the multiplier 101) to generate a first product. Similarly, at block 402b, a third value (e.g., A1) and a fourth value (e.g., B1) are multiplied (e.g., by the multiplier 102) to generate a second product. According to one or more embodiments described herein, the first product and the second product are each a 32-bit floating-point number (single precision). In examples, the first value, the second value, the third value, and the fourth value are in one of the following formats: IEEE-754 half-precision format, bfloat-16 format, and DLfloat16 format. At block 402c the first product and the second product are summed (e.g., by the adder/rounder 103) to generate a summed value. According to one or more embodiments described herein, the summed value is a 32-bit floating-point number (single precision). At block 402d, the summed value is added (e.g., by the adder/rounder 104) to an addend value (e.g., addend C) to generate a result value (e.g., Output R). According to one or more embodiments described herein, the addend value and the result value are 32-bit floating-point numbers (single precision). The process depicted in blocks 402a-402d can iterate through multiple different values to perform the plurality of MAC operations, as shown by the arrow 403.

At block 404, the result values of the plurality of MAC operations are used to train a deep neural network. By using the disclosed techniques for performing MAC operations, as described regarding blocks 402a-402d, latency and throughput are both improved. For example, latency of the addend back to input of the MAC operation is reduced while also reducing throughput.

Additional processes also may be included. According to one or more embodiments described herein, the first product and the second product each include a mantissa component and an exponent component. In such examples, the method 400 can further include rounding the exponent component of at least one of the first product and the second product and adding a rounded portion of the rounding of the exponent component of at least one of the first product and the second product to the addend value to produce the rust value rounded to single precision. According to one or more embodiments described herein, the method 400 can further include, responsive to at least one of the first product, the second product, or the summed value exceeding a normal range, performing precision rounding on the respective first product, second product, or summed value to perform the multiplying and summing by rounding the mantissa component of the respective first product, second product, or summed value to single-precision while maintain the exponent component without rounding the exponent component. It should be understood that the process depicted in FIG. 4 represents an illustration, and that other processes may be added or existing processes may be removed, modified, or rearranged without departing from the scope of the present disclosure.

According to one or more embodiments described herein, latency of the addend back to the result is the same as that of a conventional fp32 FMA operation. IN the 4 GHz design embodiment described herein, back-to-back latency is reduced to four cycles. This allows for a fast multiply-accumulation, which is the base for the dot product used in DNN training. The latency from the product terms to the product is slightly deeper than the latency of a conventional fp32 FMA operation, but in the dot product case, that latency is hidden by streaming the products through. For example, for the 4 GHz example, the product to result latency is 6 cycles. Compared to conventional approaches implementing multiply-multiply-add, the present techniques have a shorter back-to-back latency for the accumulation portion. This makes it easier for a sequencer to keep the engine fully occupied and to not increase the number of rename registers and the size of the sequencer data structures compared to a conventual design.

In the case of DNN training, the products are usually within a certain range of each other, whereas the accumulated sum can grow much larger. The present techniques can implement "chunking." Chunking partitions the products in several groups, adds the products within each group, and then adds the partial sums together. This approach is more stable than conventional approaches and enables a large part of the accumulation to be maintained even in fp16. Chunking further improves stability and reduces pipeline depth.

Example embodiments of the disclosure include or yield various technical features, technical effects, and/or improvements to technology. Example embodiments of the disclosure provide techniques for performing a mixed precision floating-point multiply-add operation which can be used to train a deep neural network, for example. The mixed precision floating-point multiply-add operation described herein constitute technical features that yield various technical effects, including: the operand and result vectors are equally wide, which makes it easy to use in SIMD implementations; compared to a conventional fp32 FMA operation, the fp16 FMMA approach described herein allows implementations with two-times throughput and the same back-to-back latency; the fp16 FMMA approach can be extended to fp8, for example, without increasing the back-to-back latency of the accumulation path. As a result of these technical features and technical effects, the techniques for performing a mixed precision floating-point multiply-add operation in accordance with example embodiments of the disclosure represents an improvement to existing floating-point operation techniques. Further, by implementing these techniques when training a DNN, the DNN training is improved by reducing latency and improving throughput when performing MAC operations. It should be appreciated that the above examples of technical features, technical effects, and improvements to technology of example embodiments of the disclosure are merely illustrative and not exhaustive.

Figure 5:
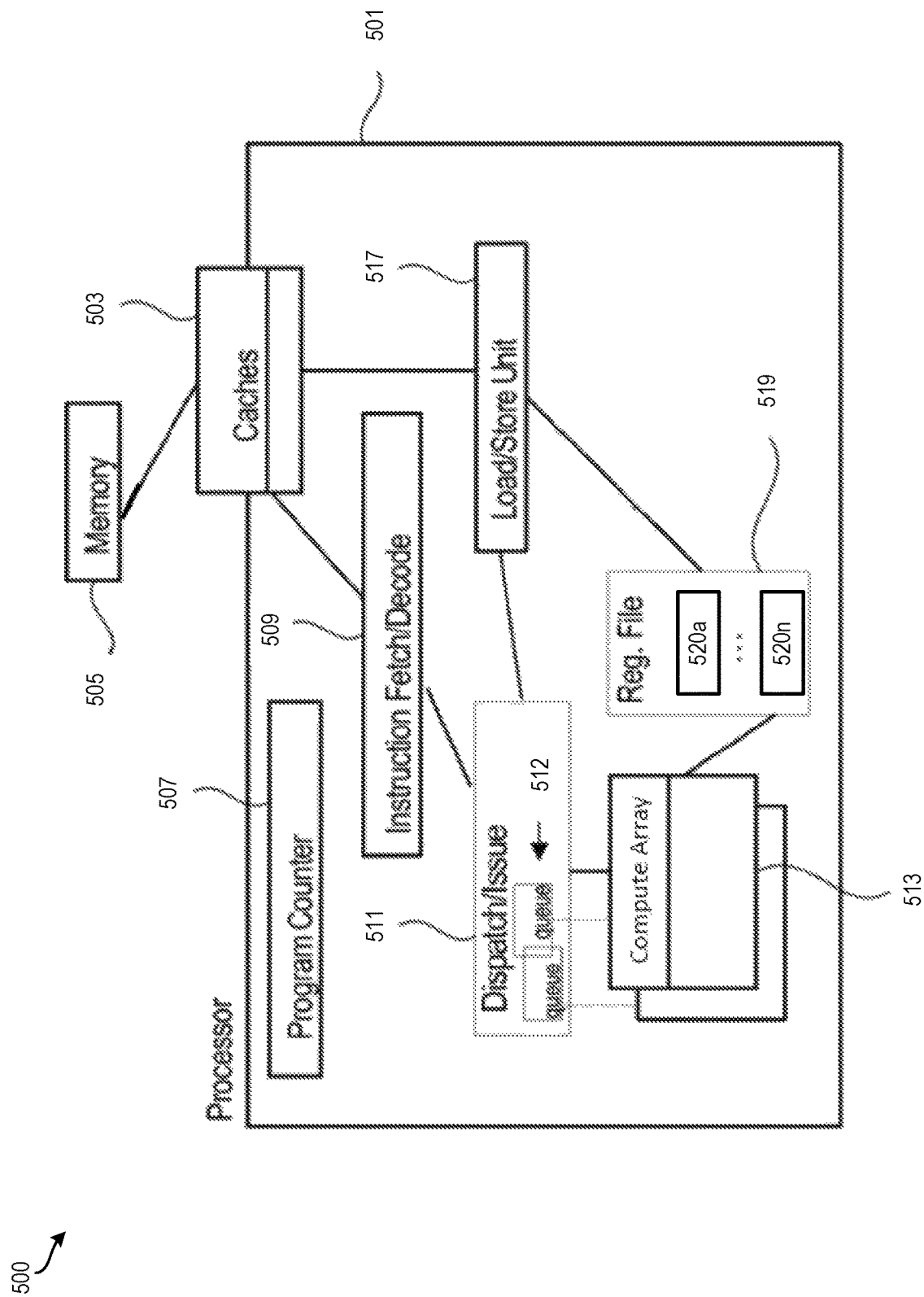
FIG. 5 is a block diagram illustrating a processing system according to one or more embodiments described herein.

Referring to FIG. 5, a block diagram illustrating a structure of a processing system 500 including a processor 501 is depicted in accordance with an embodiment. The processing system 500 may enable storing data for performing operations on the stored data. According to an embodiment, one or more levels of a cache 503 of the processing system 500 may be employed to buffer memory data in order to improve processor performance. The cache 503 may include a high-speed buffer holding cache lines of memory data that are likely to be used. For example, typical cache lines may include 64, 128, or 256 bytes of memory data. According to an embodiment, the cache 503 may be configured to cache data of higher hierarchical storage, such as a main memory storage 505.

According to an embodiment, the processor 501 may further include a register file 519 with registers 520*a*-*n*. The registers 520*a*-*n* may, for example, include general-purpose registers that each includes a number of bits to store data items processed by instructions executed in the processor 501.

According to an embodiment, the instructions may be provided by a compiler. For example, source code of a program may be compiled into a series of machine-executable instructions defined in an instruction set architecture ("ISA") associated with the processing system 500. The ISA may include at least one processor instruction defined in accordance with at least one embodiment of the present disclosure. The instructions of the ISA may be provided to process data stored in memory 505 and/or in the registers 520*a*-*n* of the register file 519 of the processor 501. According to one embodiment, when the processor 501 starts to execute the executable instructions, these machine-executable instructions may be placed in order to be executed sequentially.

According to an embodiment, an instruction fetch/decode unit 509 may be employed to fetch placed instructions. For example, the instruction fetch/decode unit 509 may fetch the next sequential instructions, the target instructions of branch taken instructions, or the first instructions of a program following a context switch. The fetched instructions may be decoded by the instruction fetch/decode unit 509.

According to an embodiment, the decoded instruction(s) may be passed to a dispatch/issue unit 511. The dispatch/issue unit 511 may deposit the instructions in one or more issue queues 512, where the instructions may wait for source operands and an appropriate compute array 513 of the processor 501 to become available. For example, each compute array 513 of the compute arrays 513 may be associated with an issue queue 512 such that instructions to be executed by the compute array 513 may be queued in the issue queue 512 associated with the compute array 513. The dispatch/issue unit 511 may deposit the instructions in an issue queue 512 based on an index that is assigned to the compute array 513 of the issue queue 512. This index may be part of the instructions. That is, by reading the index from an instruction, the dispatch/issue unit 511 may know (e.g., determine) which compute array 513 can execute the instruction. Each compute array 513 of the compute arrays 513 may be configured to execute one respective type of instruction which may not be executed by other compute arrays 513. In one embodiment, a type of an instruction may be defined by the registers associated with the instruction.

In conventional methods, every execution unit may be implemented to execute every instruction (e.g., any instruction can go to any execution unit). However, the conventional methods may be more expensive in terms of processing resources.

According to an embodiment, each issue queue 512 may include window logic which may be responsible for monitoring dependencies between instructions in the queue and issuing instructions to the respective compute array 513. The window logic may include wakeup logic and select logic. The wakeup logic may be responsible for invoking instructions waiting in the issue queue 512 for the source operands to become available. Once all the source operands of an instruction are available, the instruction may be flagged ready for execution. The select logic may be responsible for selecting instructions for execution from the pool of ready instructions. An instruction may be ready if all of its source operands are available. Then the operand values of the instruction may be loaded from the memory 105 and/or registers using a load/store unit 517.

A compute array 513 may receive information about instructions from the dispatch/issue unit 511 and may perform operations on operands according to the operation code of the instruction. Operands are provided to the compute array 513 from registers in accordance with the present disclosure. Results of the execution, when stored, may be stored either in memory 505 and/or registers 519. According to an embodiment, each compute array 513 may include multiple compute elements with at least one multiplier (e.g., the multipliers 101, 102 of FIG. 1) and at least one adder (e.g., the adder/rounders 103, 104 of FIG. 1). Each multiplier of the compute array 513 may be configured to perform the product of two numbers and the adder may be configured to add the product to the content of an accumulator associated with the multiplier or to a content of an accumulator element associated with the multiplier. The compute array 513 may be configured to perform multiple MAC operations in parallel in at least one clock cycle. In one example, the compute array 513 may include an X number of multipliers that may enable the compute array 513 to perform an X number of MAC operations or other linear algebra operations in at least one clock cycle.

According to an embodiment, a program counter (instruction counter) 507 may keep track of the address of the current instruction to be executed. For example, a program counter 507 in processor, such as, a z/Architecture® (z/Architecture and all IBM-based trademarks and logos are trademarks or registered trademarks of International Business Machines Corporation and/or its affiliates) processor may include 64 bits and may be truncated to 31 or 24 bits to support prior addressing limits. A program counter 507 may be embodied in a program status word ("PSW") of a computer such that it persists during context switching. In an embodiment, the program counter may be incremented by an amount equal to the number of bytes of the current instruction.

The processing system 500 may be configured to perform a pipelined execution of the instructions. For example, a four-cycle latency pipelined execution may be used by each compute array 513 of the processor 501 such that each instruction may take the compute array 513 four clock cycles to produce the result of the linear algebra operations. For that, the execution of the instruction at the compute array 513 may be broken down into four processes, where one of the four processes may include a multiplication process and another of the four processes may include the accumulation process.

According to one embodiment, the processing system 500 may be configured to operate in an ST mode, an SMT2 mode, or an SMT4 mode. In ST mode, MAC operations from one thread may be performed or handled at a time by the compute arrays 513. For example, in the ST mode, each of the compute arrays 513 may be configured so that the compute arrays 513 receive instructions from one specific thread (e.g., T0). In SMT2 mode, the compute arrays 513 may receive instructions from any one of two threads. For example, in the SMT2 mode, each of the compute arrays 513 may be configured so that the compute arrays 513 receive instructions from thread T0 and/or thread T1. In SMT4 mode, each compute array 513 may receive processor instructions from all four threads (e.g., T0, T1, T2 and T3) or the compute array 513 may operate in a split mode to receive two threads. For example, in split mode, if the processing system 500 includes two compute arrays 513, one compute array 513 may be configured to process instructions from thread T0 and/or thread T2 and the other compute array 513 may be configured to process instructions from thread T1 and/or thread T3.

Thus, the processing system 500 may enable processing instructions from one or more programs using compute arrays 513. For example, the source code of a program may implement one or more MAC operations. A MAC operation may include multiplying two numbers and adding the result of the multiplication to an accumulated value such as depicted in FIG. 1 and described with respect thereto. At least one MAC operation may be performed by the compute array 513 by executing a respective processor instruction of the ISA.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
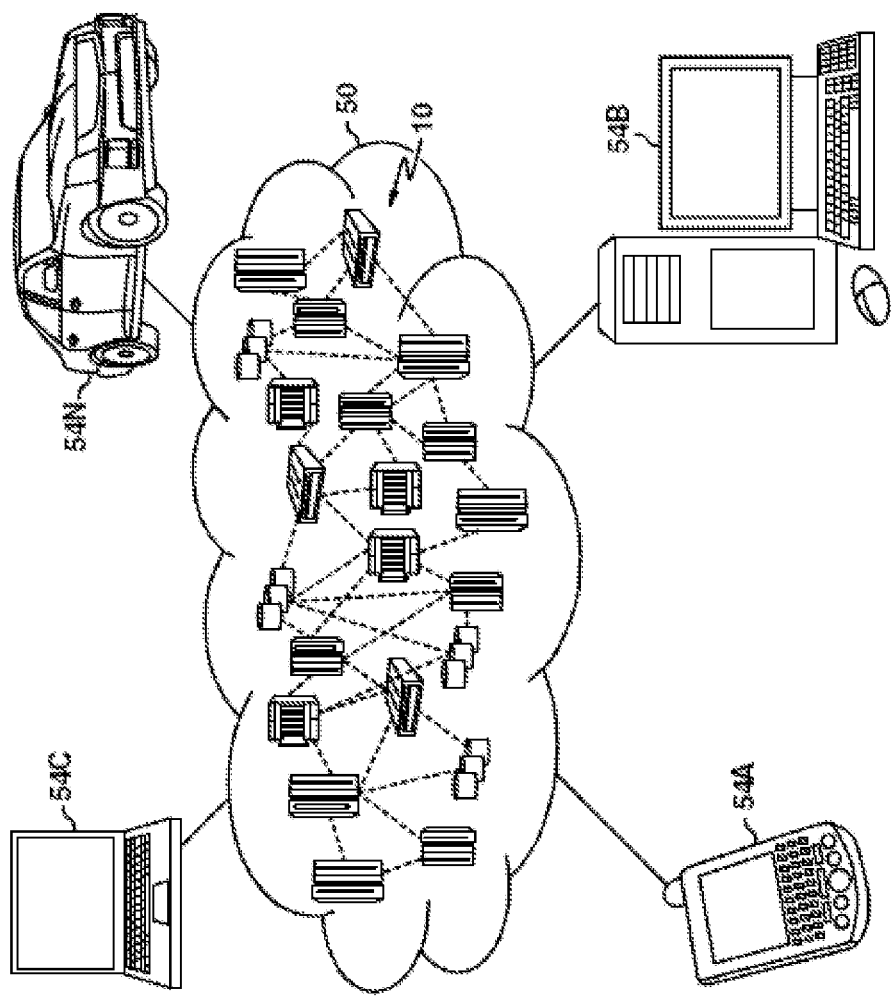
FIG. 6 depicts a cloud computing environment according to one or more embodiments described herein.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
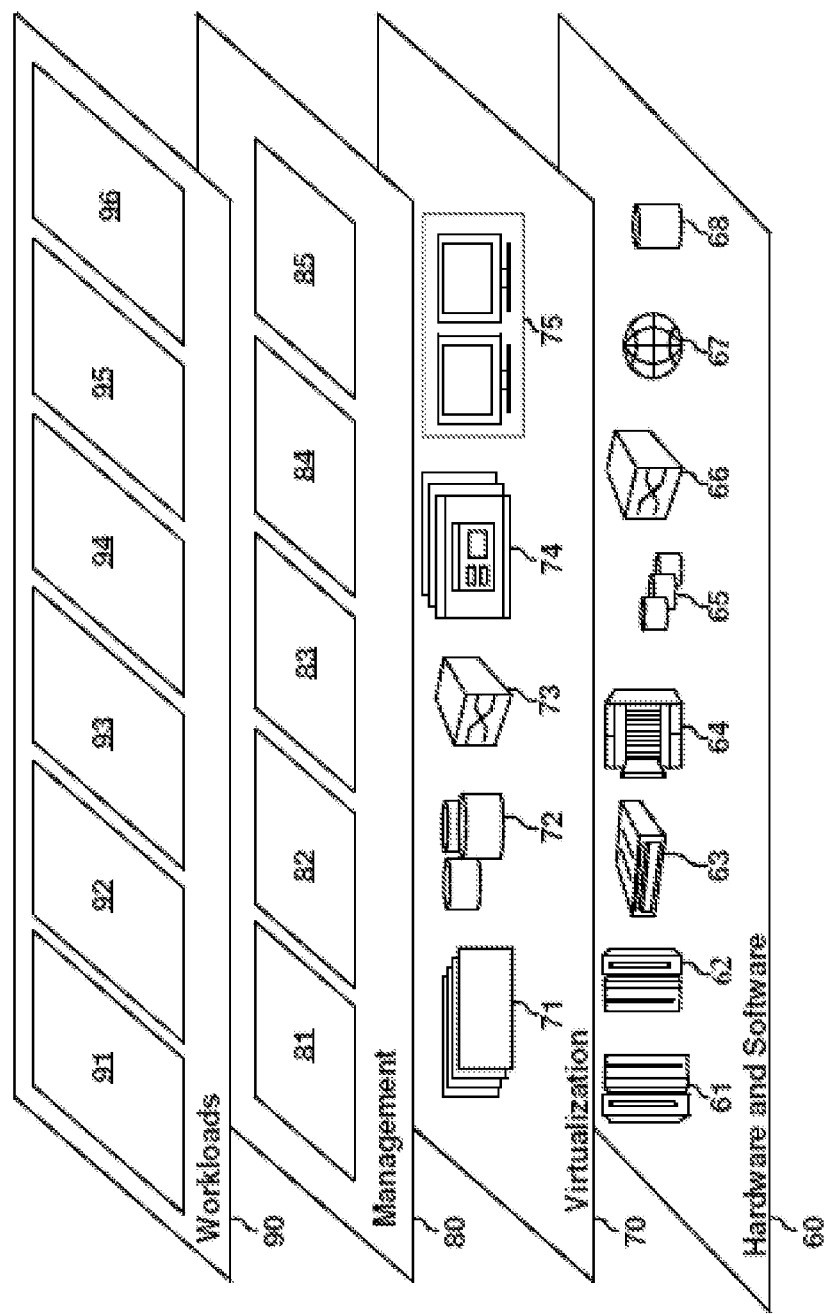
FIG. 7 depicts abstraction model layers according to one or more embodiments described herein.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and training a neural network 96.

Figure 8:
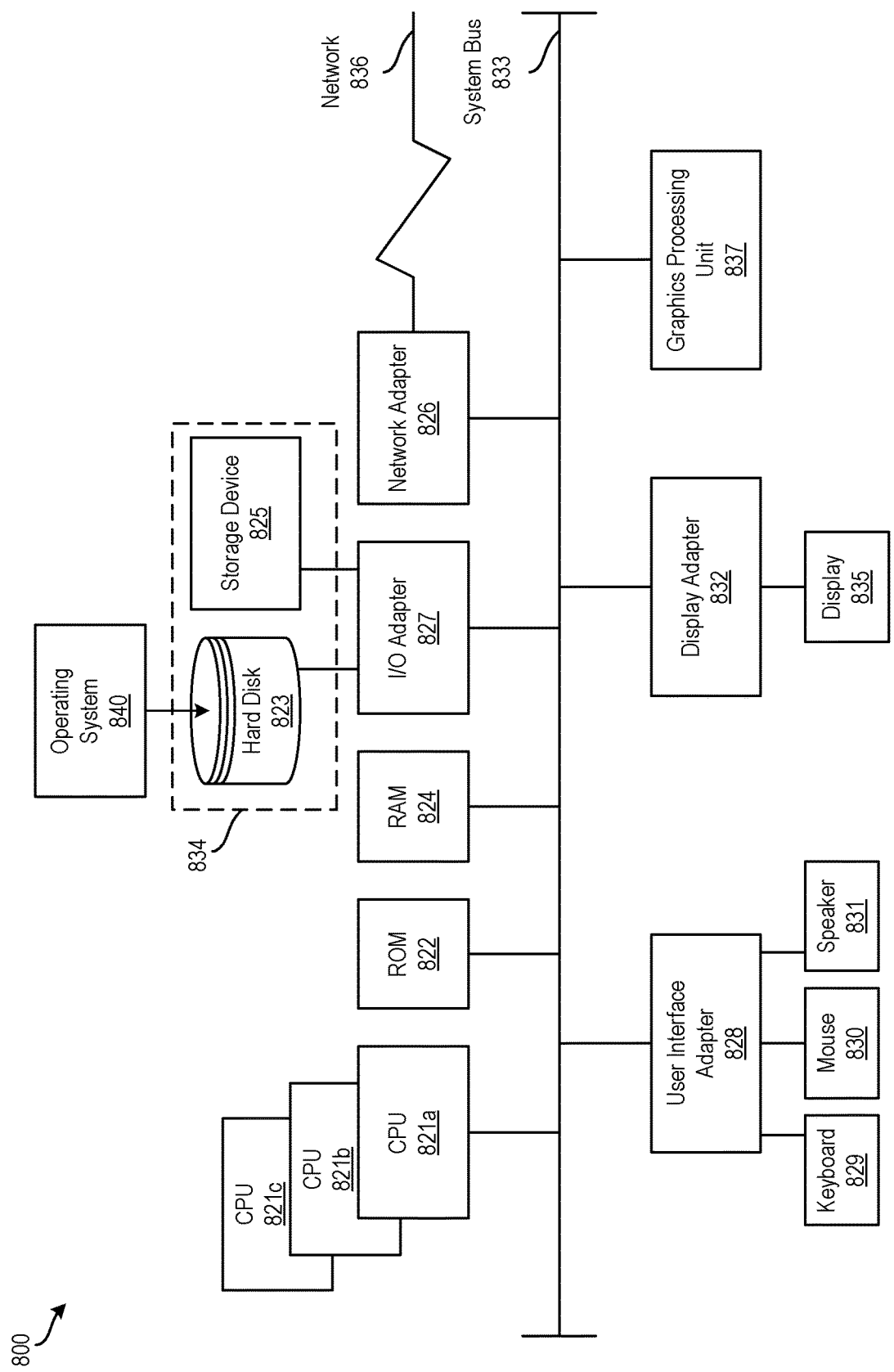
FIG. 8 depicts a block diagram of a processing system for implementing the presently described techniques according to one or more embodiments described herein.

It is understood that one or more embodiments described herein is capable of being implemented in conjunction with any other type of computing environment now known or later developed. For example, FIG. 8 depicts a block diagram of a processing system 800 for implementing the techniques described herein. In accordance with one or more embodiments described herein, the processing system 800 is an example of a cloud computing node 10 of FIG. 6. In examples, processing system 800 has one or more central processing units ("processors" or "processing resources") 821a, 821b, 821c, etc. (collectively or generically referred to as processor(s) 821 and/or as processing device(s)). In aspects of the present disclosure, each processor 821 can include a reduced instruction set computer (RISC) microprocessor. Processors 821 are coupled to system memory (e.g., random access memory (RAM) 824) and various other components via a system bus 833. Read only memory (ROM) 822 is coupled to system bus 833 and may include a basic input/output system (BIOS), which controls certain basic functions of processing system 800.

Further depicted are an input/output (I/O) adapter 827 and a network adapter 826 coupled to system bus 833. I/O adapter 827 may be a small computer system interface (SCSI) adapter that communicates with a hard disk 823 and/or a storage device 825 or any other similar component. I/O adapter 827, hard disk 823, and storage device 825 are collectively referred to herein as mass storage 834. Operating system 840 for execution on processing system 800 may be stored in mass storage 834. The network adapter 826 interconnects system bus 833 with an outside network 836 enabling processing system 800 to communicate with other such systems.

A display (e.g., a display monitor) 835 is connected to system bus 833 by display adapter 832, which may include a graphics adapter to improve the performance of graphics intensive applications and a video controller. In one aspect of the present disclosure, adapters 826, 827, and/or 832 may be connected to one or more I/O busses that are connected to system bus 833 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 833 via user interface adapter 828 and display adapter 832. A keyboard 829, mouse 830, and speaker 831 may be interconnected to system bus 833 via user interface adapter 828, which may include, for example, a Super I/O chip integrating multiple device adapters into a single integrated circuit.

In some aspects of the present disclosure, processing system 800 includes a graphics processing unit 837. Graphics processing unit 837 is a specialized electronic circuit designed to manipulate and alter memory to accelerate the creation of images in a frame buffer intended for output to a display. In general, graphics processing unit 837 is very efficient at manipulating computer graphics and image processing, and has a highly parallel structure that makes it more effective than general-purpose CPUs for algorithms where processing of large blocks of data is done in parallel.

Thus, as configured herein, processing system 800 includes processing capability in the form of processors 821, storage capability including system memory (e.g., RAM 824), and mass storage 834, input means such as keyboard 829 and mouse 830, and output capability including speaker 831 and display 835. In some aspects of the present disclosure, a portion of system memory (e.g., RAM 824) and mass storage 834 collectively store the operating system 840 such as the AIX® operating system from IBM Corporation to coordinate the functions of the various components shown in processing system 800.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for performing a mixed precision floating-point multiply-add operation, the method comprising:
   receiving, by a processing device, a first value, a second value, a third value, and a fourth value, wherein the first value, the second value, the third value, and the fourth value are 16-bit or smaller precision floating-point numbers;
   multiplying, by the processing device, the first value and the second value to generate a first product, wherein the first product is a 32-bit floating-point number;
   multiplying, by the processing device, the third value and the fourth value to generate a second product, wherein the second product is a 32-bit floating-point number;
   summing, by the processing device, the first product and the second product to generate a summed value, wherein the summed value is a 32-bit floating-point number, wherein summing the first product and the second product comprises, responsive to determining that the summed value exceeds a threshold, partitioning the first product and the second product into groups, adding products within each group as partial sums, and adding the partial sums together to generate the summed value;
   adding, by the processing device, the summed value to an addend value to generate a result value, wherein the addend value and the result value are 32-bit floating-point numbers, wherein the result value is fed back into the adding as the addend value in a subsequent iteration; and
   training, by the processing device, a deep neural network based at least in part on the result value.

2. The computer-implemented method of claim 1, wherein the first product and second product are computed without rounding, and wherein the summed value and the result value are rounded according to IEEE-754 standard.

3. The computer-implemented method of claim 2, wherein the first value, the second value, the third value, and the fourth value are in a format selected from the group consisting of IEEE-754 half precision format, a bfloat-16 format, and a DLfloat16 format.

4. The computer-implemented method of claim 1, further comprising:
   responsive to at least one of the first product, the second product, or the summed value exceeding a normal range, performing precision rounding on the respective first product, second product, or summed value to perform the multiplying and summing by rounding a mantissa component of the respective first product, second product, or summed value to single precision while maintaining an exponent component without rounding the exponent component.

5. The computer-implemented method of claim 4, wherein the first value, the second value, the third value, and the fourth value are in a bfloat-16 format.

6. The computer-implemented method of claim 1, wherein the first value and the second value are interpreted together as a first 32-bit floating point value and the third value and the fourth value are interpreted together as a second 32-bit floating point value, and wherein the first 32-bit floating point value and the second 32-bit floating point value are used to perform a multiply-add operation.

7. The computer-implemented method of claim 6, where the multiplying is performed using a booth multiplier that implements a reduction tree technique.

8. The computer-implemented method of claim 1, wherein summing the first product and the second product is performed using a floating-point adder, which uses a near-far path technique.

9. A system comprising:
   a memory comprising computer readable instructions; and a processing device for executing the computer readable instructions, the computer readable instructions controlling the processing device to perform operations comprising:

receiving, by the processing device, a first value, a second value, a third value, and a fourth value, wherein the first value, the second value, the third value, and the fourth value are 16-bit floating-point numbers;

multiplying, by the processing device, the first value and the second value to generate a first product, wherein the first product is a 32-bit floating-point number;

multiplying, by the processing device, the third value and the fourth value to generate a second product, wherein the second product is a 32-bit floating-point number;

summing, by the processing device, the first product and the second product to generate a summed value, wherein the summed value is a 32-bit floating-point number, wherein summing the first product and the second product comprises, responsive to determining that the summed value exceeds a threshold, partitioning the first product and the second product into groups, adding products within each group as partial sums, and adding the partial sums together to generate the summed value;

adding, by the processing device, the summed value to an addend value to generate a result value, wherein the addend value and the result value are 32-bit floating-point numbers, wherein the result value is fed back into the adding as the addend value in a subsequent iteration; and training, by the processing device, a deep neural network based at least in part on the result value.

10. The system of claim 9, wherein the first product and second product are computed without rounding, and wherein the summed value and the result value are rounded according to IEEE-754 standard.

11. The system of claim 10, wherein the first value, the second value, the third value, and the fourth value are in a format selected from the group consisting of IEEE-754 half precision format, a bfloat-16 format, and a DLfloat16 format.

12. The system of claim 9, the operations further comprising:

responsive to at least one of the first product, the second product, or the summed value exceeding a normal range, performing precision rounding on the respective first product, second product, or summed value to perform the multiplying and summing by rounding a mantissa component of the respective first product, second product, or summed value to single precision while maintaining an exponent component without rounding the exponent component.

13. The system of claim 12, wherein the first value, the second value, the third value, and the fourth value are in a bfloat-16 format.

14. The system of claim 9, wherein the first value and the second value are interpreted together as a first 32-bit floating point value and the third value and the fourth value are interpreted together as a second 32-bit floating point value, and wherein the first 32-bit floating point value and the second 32-bit floating point value are used to perform a multiply-add operation.

15. The system of claim 14, where the multiplying is performed using a booth multiplier that implements a reduction tree technique.

16. The system of claim 9, wherein summing the first product and the second product is performed using a floating-point adder, which uses a near-far path technique.

17. A computer program product comprising a computer readable storage medium having program instructions embodied therewith, the program instructions executable by a processor to cause the processor to perform operations comprising:

receiving, by the processing device, a first value, a second value, a third value, and a fourth value, wherein the first value, the second value, the third value, and the fourth value are 16-bit floating-point numbers;

multiplying, by the processing device, the first value and the second value to generate a first product, wherein the first product is a 32-bit floating-point number;

multiplying, by the processing device, the third value and the fourth value to generate a second product, wherein the second product is a 32-bit floating-point number;

summing, by the processing device, the first product and the second product to generate a summed value, wherein the summed value is a 32-bit floating-point number, wherein summing the first product and the second product comprises, responsive to determining that the summed value exceeds a threshold, partitioning the first product and the second product into groups, adding products within each group as partial sums, and adding the partial sums together to generate the summed value;

adding, by the processing device, the summed value to an addend value to generate a result value, wherein the addend value and the result value are 32-bit floating-point numbers, wherein the result value is fed back into the adding as the addend value in a subsequent iteration; and training, by the processing device, a deep neural network based at least in part on the result value.

18. A computer-implemented method for training a deep neural network, the method comprising:

performing, by a processing device, a plurality of multiply-and-accumulate (MAC) operations, wherein each of the plurality of MAC operations is performed by:

multiplying, by the processing device, a first value and a second value to generate a first product, wherein the first value and the second value are 16-bit floating-point numbers, and wherein the first product is a 32-bit floating-point number;

multiplying, by the processing device, a third value and a fourth value to generate a second product, wherein the third value and the fourth value are 16-bit floating-point numbers, and wherein the second product is a 32-bit floating-point number;

summing, by the processing device, the first product and the second product to generate a summed value, wherein the summed value is a 32-bit floating-point number, wherein summing the first product and the second product comprises, responsive to determining that the summed value exceeds a threshold, partitioning the first product and the second product into groups, adding products within each group as partial sums, and adding the partial sums together to generate the summed value; and adding, by the processing device, the summed value to an addend value to generate a result value, wherein the addend value and the result value are 32-bit floating-point numbers, wherein the result value is fed back into the adding as the addend value in a subsequent iteration; and training, by the processing device, the deep neural network based at least in part on the result value of the each of the MAC operations.

19. The computer-implemented method of claim 18, wherein the first product and second product are computed without rounding, and wherein the summed value and the result value are rounded according to IEEE-754 standard.

20. The computer-implemented method of claim 19, wherein the first value, the second value, the third value, and the fourth value are in a format selected from the group consisting of IEEE-754 half precision format, a bfloat-16 format, and a DLfloat16 format.

21. The computer-implemented method of claim 19, further comprising:

responsive to at least one of the first product, the second product, or the summed value exceeding a normal range, performing precision rounding on the respective first product, second product, or summed value to perform the multiplying and summing by rounding a mantissa component of the respective first product, second product, or summed value to single precision while maintaining an exponent component without rounding the exponent component.

22. The computer-implemented method of claim 21, wherein the first value, the second value, the third value, and the fourth value are in a bfloat-16 format.

23. The computer-implemented method of claim 18, wherein the first value and the second value are interpreted together as a first 32-bit floating point value and the third value and the fourth value are interpreted together as a second 32-bit floating point value, and wherein the first 32-bit floating point value and the second 32-bit floating point value are used to perform a multiply-add operation.

24. The computer-implemented method of claim 23, where the multiplying is performed using a booth multiplier that implements a reduction tree technique.

25. A computer program product comprising a computer readable storage medium having program instructions embodied therewith, the program instructions executable by a processor to cause the processor to perform operations for training a deep neural network, the operations comprising:

performing, by the processing device, a plurality of multiply-and-accumulate (MAC) operations, wherein each of the plurality of MAC operations is performed by:

multiplying, by the processing device, a first value and a second value to generate a first product, wherein the first value and the second value are 16-bit floating-point numbers, and wherein the first product is a 32-bit floating-point number;

multiplying, by the processing device, a third value and a fourth value to generate a second product, wherein the third value and the fourth value are 16-bit floating-point numbers, and wherein the second product is a 32-bit floating-point number;

summing, by the processing device, the first product and the second product to generate a summed value, wherein the summed value is a 32-bit floating-point number, wherein summing the first product and the second product comprises, responsive to determining that the summed value exceeds a threshold, partitioning the first product and the second product into groups, adding products within each group as partial sums, and adding the partial sums together to generate the summed value;

adding, by the processing device, the summed value to an addend value to generate a result value, wherein the addend value and the result value are 32-bit floating-point numbers, wherein the result value is fed back into the adding as the addend value in a subsequent iteration; and training, by the processing device, a deep neural network based at least in part on the result value of the each of the MAC operations.

* * * * *